US011233648B2

(12) United States Patent
Tabrizi

(10) Patent No.: US 11,233,648 B2
(45) Date of Patent: Jan. 25, 2022

(54) IDENTITY SYSTEM FOR USE WITH BLOCKCHAIN PLATFORM

(71) Applicant: Microsoft Technology Licensing, LLC, Redmond, WA (US)

(72) Inventor: Shawn Jafari Tabrizi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 411 days.

(21) Appl. No.: 16/272,813

(22) Filed: Feb. 11, 2019

(65) Prior Publication Data

US 2020/0076601 A1 Mar. 5, 2020

Related U.S. Application Data

(60) Provisional application No. 62/726,869, filed on Sep. 4, 2018.

(51) Int. Cl.
*H04L 29/06* (2006.01)
*H04L 9/32* (2006.01)
(Continued)

(52) U.S. Cl.
CPC ....... *H04L 9/3213* (2013.01); *G06Q 20/3829* (2013.01); *H04L 9/0637* (2013.01); *H04L 9/3239* (2013.01); *H04L 2209/38* (2013.01)

(58) Field of Classification Search
CPC ... H04L 9/3213; H04L 9/3239; H04L 9/0637; H04L 2209/38; H04L 9/3247;
(Continued)

(56) References Cited

U.S. PATENT DOCUMENTS 9,635,000 B1 4/2017 Muftic
10,121,143 B1 11/2018 Madisetti et al.
(Continued)

OTHER PUBLICATIONS

"Cross-Chain Bridges: Paving the Way to Internet of Blockchains", Retrieved From: https://medium.com/poa-network/cross-chain-bridges-paving-the-way-to-internet-of-blockchains-422ac94bc2e5, Nov. 15, 2017, 9 Pages.
"Ethereum/wiki—JSON RPC", Retrieved from: https://github.com/ethereum/wiki/wiki/JSON-RPC, Retrieved Date: Aug. 3, 2018, 70 Pages.
"How Blockchain Can Give Us Back Control of Our Identity and Help Avoid Another Facebook/Cambridge Analytica Scandal", Retrieved from: https://medium.com/torque-capital-partners/how-blockchain-can-give-us-back-control-of-our-identity-and-help-avoid-another-facebook-cambridge-eda2fd7303ee, Apr. 16, 2018, 13 Pages.
(Continued)

*Primary Examiner* — Mahfuzur Rahman
(74) *Attorney, Agent, or Firm* — Alleman Hall Creasman & Tuttle LLP

(57) ABSTRACT

An identity system is provided that may include an attestation service that is configured to communicate with a user computer device and a blockchain platform, and create a blockchain account for the attestation service on the blockchain platform, the account having an associated backend blockchain identity application. The attestation service may further be configured to determine that a user of the user computing device owns a user blockchain account by obtaining a signed message of the user. The signed message may include a user access token from the user of the user computer device and a blockchain address of the user to associate with the access token, the user access token having been generated by a trusted identity provider service. The attestation service may further be configured to identify one or more identity claims associated with the token, and store the identity claim for future presentation to a third party.

20 Claims, 5 Drawing Sheets

(51) Int. Cl.
*G06Q 20/38* (2012.01)
*H04L 9/06* (2006.01)

(58) Field of Classification Search
CPC ......... G06Q 20/3829; G06Q 20/38215; G06Q 20/4014; G06Q 20/02; G06Q 2220/00
See application file for complete search history.

(56) References Cited

U.S. PATENT DOCUMENTS

| | | | |
|---|---|---|---|
| 10,963,881 B2* | 3/2021 | Davis | G06Q 40/02 |
| 2017/0178128 A1* | 6/2017 | Fourez | G06F 16/22 |
| 2017/0338963 A1 | 11/2017 | Berg | |
| 2017/0352027 A1 | 12/2017 | Zhang et al. | |
| 2018/0129954 A1 | 5/2018 | Saxena et al. | |
| 2018/0309567 A1 | 10/2018 | Wooden | |
| 2019/0018887 A1* | 1/2019 | Madisetti | H04L 9/3247 |
| 2019/0333054 A1* | 10/2019 | Cona | G06F 21/31 |
| 2020/0322167 A1* | 10/2020 | Wilkins | G06Q 40/04 |
| 2021/0152365 A1* | 5/2021 | Nosseir | H04L 9/083 |

OTHER PUBLICATIONS

"Sybil Attack", Retrieved from: https://en.wikipedia.org/wiki/Sybil_attack, Dec. 29, 2018, 4 Pages.

Chen, Richard, "Understanding Decentralized Identity", Retrieved from: https://thecontrol.co/understanding-decentralized-identity-433abb343279, Sep. 7, 2018, 10 Pages.

Marx, Steve, "Signing and Verifying Messages in Ethereum", Retrieved from: https://programtheblockchain.com/posts/2018/02/17/signing-and-verifying-messages-in-ethereum/, Feb. 17, 2018, 10 Pages.

Rouviere, et al., "ConsenSys/Tokens—Ethereum Token Contracts", Retrieved from: https://github.com/ConsenSys/Tokens, Retrieved Date: Aug. 3, 2018, 2 Pages.

White, et al., "Future Applications of Blockchain: toward a value-based society", In Proceedings of the INCITE Conference, vol. 10, Oct. 1, 2016, 41 Pages.

Xu, et al., "The Blockchain as a Software Connector", In Proceedings of the 13th Working IEEE/IFIP Conference on Software Architecture, Apr. 5, 2016, 10 Pages.

* cited by examiner

IDENTITY SYSTEM FOR USE WITH BLOCKCHAIN PLATFORM

CROSS REFERENCE TO RELATED APPLICATIONS

This application claims priority to U.S. Provisional Patent Application Ser. No. 62/726,869, filed Sep. 4, 2018, the entirety of which is hereby incorporated herein by reference for all purposes.

BACKGROUND

Blockchain identities are anonymous and cost little or nothing to create for users. Decentralized applications built on blockchain technologies are thus potentially vulnerable to Sybil attacks, which are attacks in which a large number of user accounts are created by a nefarious actor and used to subvert aspects of the decentralized applications.

On the other hand, modern day web-based applications utilize trusted identity providers, which enable information regarding owner of the identity to easily be transferred between and persist between different web-based applications. In this way, both the user and the application provider build social value into the user's identity through its use across these various web-based applications. Current blockchain technologies do not enable such cross-platform utilization of trusted identities.

SUMMARY

An identity system is provided that may include an attestation service executed on a first server having a processor and associated non-volatile memory. The attestation service may be configured to communicate via a computer network with a user computer device and a blockchain platform executed on at least a second server. The attestation service may execute instructions stored in the non-volatile memory via the processor to create a blockchain account for the attestation service on the blockchain platform, the account having an associated backend blockchain identity application. The attestation service may further be configured to determine that a user of the user computing device owns a user blockchain account by obtaining a signed message that has been signed with a private key of the user. The signed message may include a user access token 152 from the user of the user computer device and a blockchain address of the user to associate with the access token 152, the user access token 152 having been generated by a trusted identity provider service executed on a third server. The attestation service may further be configured to identify one or more identity claims associated with the token, and store the identity claim for future presentation to a third party.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The development of Ethereum and other blockchain platforms provides application developers with a platform to create open, distributed, decentralized, censorship free, and immutable applications. However, these applications are typically limited to interacting with the types of user accounts and other applications that exist on these blockchain platforms. Typically, user accounts on blockchain platforms are easy and cost-free to create for the user. For example, to create a new user account, the blockchain platform, a user's computer device, or another external service may be configured to generate a private key for the user, which may take the form of a 256-bit random number for example. The probability of creating a specific private key is 1/N, where N is the number of possible private keys. In this example, the number of possible private keys is $2^{256}$ (approximately $10^{77}$) and the chance of getting a certain exact private key is $10^{-77}$. Thus, having access to that private key, which may be used to sign transactions on the blockchain platform, strongly indicates that the user owns that account.

However, due to the easy and cost-free nature of these accounts, a single user may generate and control a large number of accounts anonymously. This makes applications on typical blockchain platforms susceptible to Sybil attacks. That is, a single user may utilize a large number of accounts to gain a disproportionately large influence over an application operating on the blockchain network. If that application is, for example, a voting application, then a single user may utilize a large number of accounts to sway a particular vote on that application to any target outcome. Further, if blockchain technologies were used to create a social network platform, the social network platform would be vulnerable to Sybil and other types of attacks.

Figure 1:
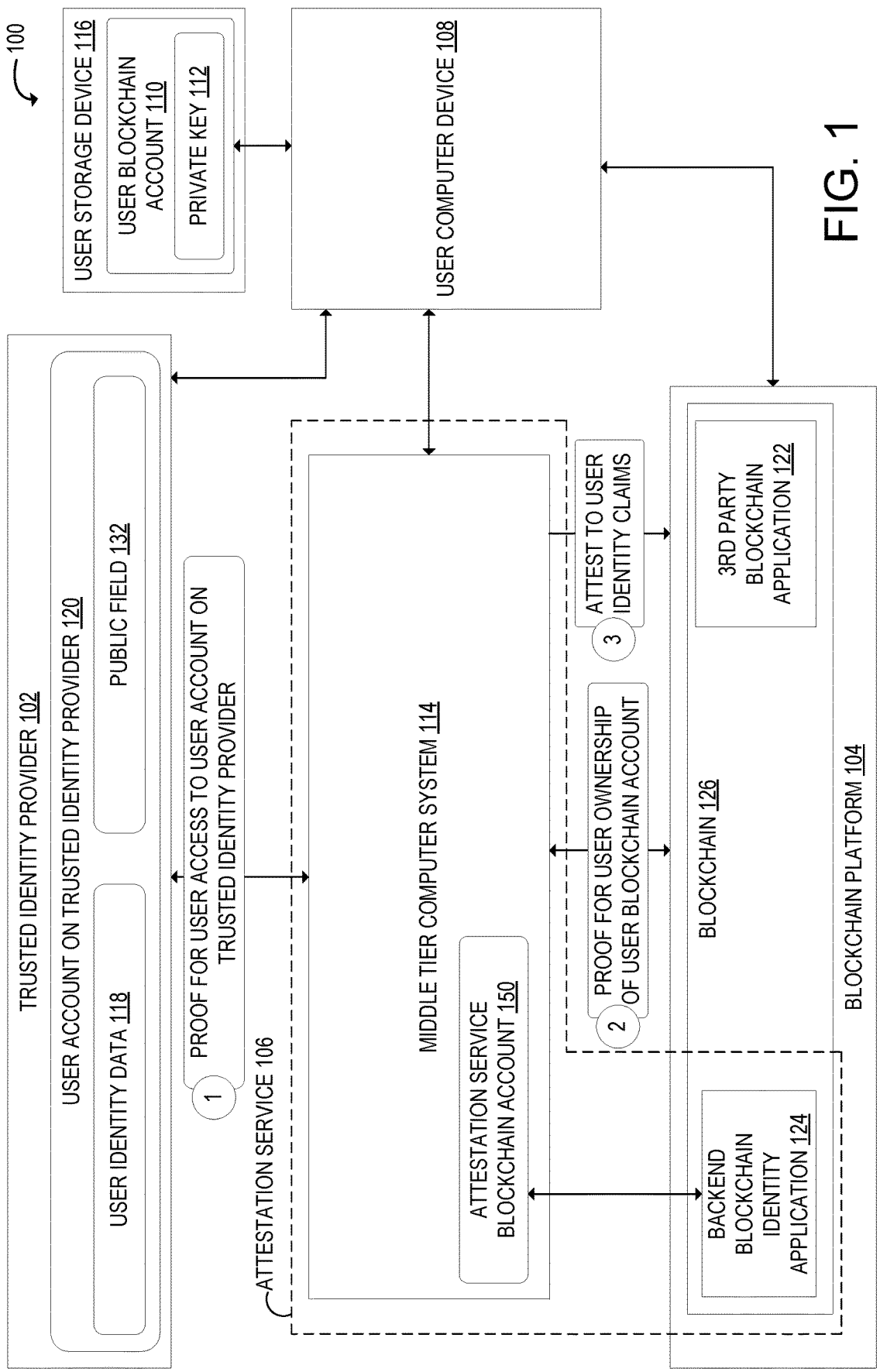
FIG. 1 shows a schematic view of an example identity attestation system for blockchain platforms.

To address these issues, FIG. 1 illustrates an example computing system 100 configured to provide a user with the capability to associate that user's identity data stored by a trusted identity provider 102 with their hitherto anonymous account on a blockchain platform 104 via an attestation service 106. The attestation service 106 may be executed at least in part on a first server, such as, for example, a middle tier computer system 114 of the example computing system 100. The middle tier computer system 114 may include a processor, associated non-volatile memory, and other computer components. The middle tier computer system 114 may be configured to communicate with the blockchain platform 104 and a user computer device 108 via a computer network, such as, for example, a wide area network (WAN). The user may interact with the trusted identity provider 102, the blockchain platform 104, and the attestation service 106 via a user computer device 108. As described above, the user may create a user blockchain account 110 for the blockchain platform 104 by generating a private key 112 using software executed on the user computer device 108, such as, for example, a blockchain wallet being run in a browser. However, it should be appreciated that the private key 112 may be created by other software services and other computer devices, such as by the middle tier computer system 114 of the attestation service 106, as will be described in more detail below.

Typically, due to security concerns, the private key 112 for the user blockchain account 110 may be stored by the user on a user storage device 116 separate from the user computer device 108, such as, for example, an external hard drive, a thumb drive, etc. However, it should be appreciated that the private key 112 for the user blockchain account 110 may be stored in other locations, such as on the user computer device 108, the middle tier computer system 114, or another computer service configured to manage the user's private keys 112 for one or more user blockchain accounts 110.

The trusted identity provider 102 may take the form of a trusted identity system, such as, for example, MICROSOFT AZURE ACTIVE DIRECTORY. However, it should be appreciated that the trusted identity provider 102 may take other forms including social network platforms such as LINKEDIN and FACEBOOK, government entities, banking systems, and other types of platforms that store user identity data 118 for users. The user may interact with the trusted identity provider 102 via the user computer device 108 to manage a user account 120 on the trusted identity provider 102 and the stored user identity data 118. The types of user identity data 118 collected by a trusted identity provider 102 may be dependent upon the type of trusted identity provider 102. For example, the user identity data 118 managed by the Azure Active Directory may include the user's employer (e.g. an employer identification), security group data for the user, the user's first and/or last name, the user's home or work location, the user's language preferences, the user's subscriptions to various applications (e.g. OFFICE, POWERPOINT, etc.), the user's demographic information, etc. As another example, the user identity data 118 managed by a social network trusted identity provider 102 may include the user's name, the user's demographic data, where the user went to school, the user's connections and friends, etc. As yet another example, the user identity data 118 managed by a government entity trusted identity provider 102 may include the user's citizenship status, where the user was born, the user's licensing data such as a driver's license, etc. It should be appreciated that the examples of user identity data 118 described above are merely exemplary, and that any other suitable types of user identity data 118 may be collected and managed by the trusted identity provider 102.

As illustrated in FIG. 1, to provide the user with the capability to associate one or more pieces of their user identity data 118 stored by the trusted identity provider 102 with their user blockchain account 110 for the blockchain platform 104, the attestation service 106 is configured to perform the following actions.

(1) Obtain proof that the user has access to the user account 120 on a selected trusted identity provider 102.

(2) Obtain proof that the user owns the user blockchain account 110 for the blockchain platform 104.

(3) Attest to user identity claims based on the user identity data 118 received from the trusted identity provider 102, and make those user identity claims available to third-party blockchain applications 122 on the blockchain platform 104.

The above steps 1-3 may be performed by a middle tier computer system 114 of the attestation service 106, which is configured to interact with the trusted identity provider 102, the blockchain platform 104, the user computer device 108, and a backend blockchain application 124 that is run on the blockchain platform 104 and owned by the attestation service 106. In one example, the middle tier computer system 114 (e.g. first server), is configured to create a blockchain account 150 for the attestation service 106 on the blockchain platform 104. As illustrated, the blockchain account 150 of the attestation service 106 is associated with the backend blockchain application 124 run on the blockchain platform 104. Specifically, the associated backend blockchain application 124 is a backend blockchain identity application that is configured to receive an identity query from a third-party blockchain application 122 that is associated with a third-party service executed on a third-party server. After receiving the identity query, the backend blockchain identity application may be configured to transmit a response to the identity query, as will be discussed in more detail below with reference to FIG. 2.

As used herein, the term "blockchain application" describes a "smart contract" that may be immutably stored on the blockchain 126 and includes computer code configured to be run by the blockchain platform 104. In one example, the blockchain platform includes a distributed virtual machine configured to execute the computer code of the smart contracts using the hardware resources of client computing devices participating in the blockchain platform 104. Each of these distributed client computing devices may store a copy of the blockchain 126 of the blockchain platform 104, verify the contents of the blockchain 126, execute the computer code of smart contracts in the blockchain 126, and verify the execution of that computer code with other client computing devices on the blockchain platform 104. At least part of the functions and processes of the blockchain platform 104 may be executed by a second server in conjunction with the client computing devices participating in the blockchain platform 104. One example blockchain platform 104 with these features is ETHEREUM. However, it should be appreciated that the processes described herein are applicable to other suitable blockchain platforms 104 that include a distributed virtual machine that provides application developers with a platform to create open, distributed, decentralized, censorship free, and immutable applications.

The backend blockchain application 124 include functions and methods that may be called/utilized by a plurality of different third-party blockchain applications 122 to confirm one or more user identity claims for the user blockchain account 110 being attested to by the attestation service 106.

Figure 2:
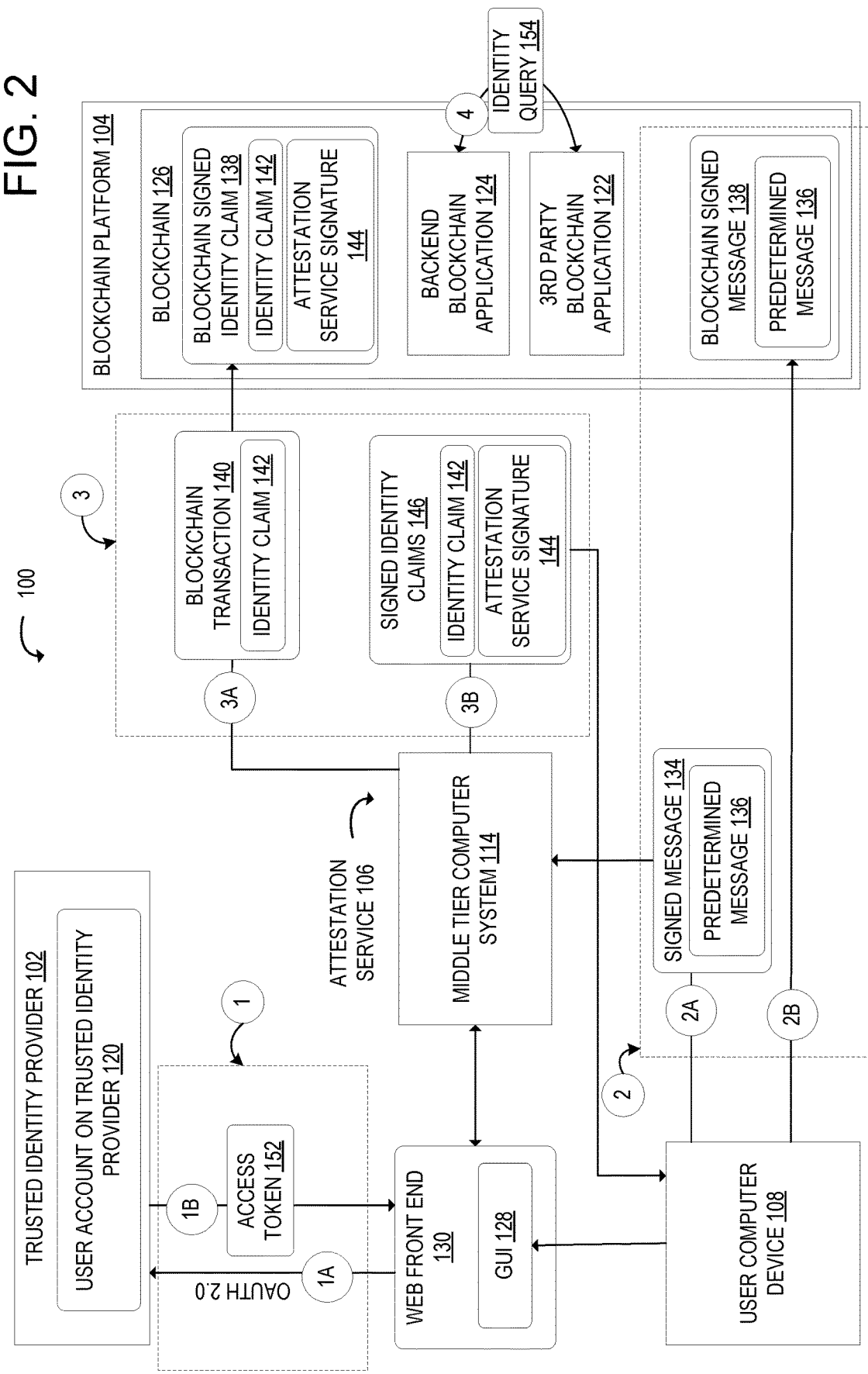
FIG. 2 shows another schematic view of the example identity attestation system of FIG. 1, more specifically illustrating a workflow between the various depicted components.

Steps 1-3 may be performed in several different manners. FIG. 2 illustrate one specific example process for performing steps 1-3 illustrated in FIG. 1. At (1), to obtain proof that the user has access to the user account 120 on a selected trusted identity provider 102, the attestation service 106 may be configured to use OAuth 2.0 or another type of protocol that provides secure delegated access to resources of the trusted identity provider 102, such as the user identity data 118. OAuth 2.0 may be used as a way for the trusted identity provider 102 to grant the attestation service 106 access to data on the user account 120 without giving the attestation service 106 access to the user's password(s) for the user account 120 on the trusted identity provider 102.

As illustrated in FIG. 2, the user may interact with a GUI 128 of a web front end 130 run by one or more web servers. The web front end 130 may include a web script package of the attestation service for verifying whether the user controls the user account 120 on the trusted identity provider 120, and passing that verification to the middle tier computer system 114 of the attestation service 106.

At (1A) the web front end 130 may be configured to communicate with the trusted identity provider 102 according to the processes specified by OAuth 2.0 that allows the user to authorize third-party access to data of the user account 120 on the trusted identity provider 102 without sharing their credentials with the attestation service 106 itself. According to the OAuth 2.0 protocol, the trusted identity provider 102 may receive the user's credentials (e.g. Login/Password) for the user account 120 and an audience value for the middle tier computer system 114. At (1B) the trusted identity provider 102 may generate a signed access token 152 for the user according to the OAuth 2.0 protocol, and send the signed access token 152 back to the user computer device 108. The signed access token 152 can be verified to be correctly signed for the trusted identity provider 102, and thus prove that the user who has that signed access token 152 has access to that user account 120 on the trusted identity provider 102. The signed access token 152 further has an audience value that includes the middle tier computer system 114 of the attestation service 106 to prove that the signed access token 152 is intended to be used to verify the user's accounts 120 on the trusted identity provider 120. Further, the signed access token 152 may be used by the attestation service 106 to access protected resources hosted by the trusted identity provider 102 with the approval of the user, such as, for example, the user identity data 118 on the user account 120. In one example, the attestation service 106 may retrieve the user identity data 118 from servers of the trusted identity provider 102. In another example, the signed access token 152 itself may include the user identity data 118, and the attestation service 106 may be configured to parse the signed access token 152 to retrieve the user identity data 118. Based on the user identity data 118, the attestation service 106 may be configured to identify one or more identity claims associated with the user access token 152, and store the one or more identity claims for future presentation to a third party. For example, the one or more identity claims may be stored on the blockchain 126 of the blockchain platform 104.

However, it should be appreciated that the other processes may be used to verify that the user has access to the user account 120 on the trusted identity provider 102. For example, the trusted identity provider 102 may provide the user with an email address for their user account 120 on the trusted identity provider 102. In this example, typical email verification processes may be used by the attestation service 106 to verify that the user has access to the user account 120. That is, the attestation service 106 may, for example, send an email to the email address associated with the user account 120 that includes a secure link or code that allows the user to verify that they have control over that email address and the user account 120 on the trusted identity provider 102.

In another example verification process, as illustrated in FIG. 1, the user may post a unique and specific message to a public field 132 of their user identity account 120 that is viewable or otherwise accessible by the attestation service 106. As a specific example, if the trusted identity provider 102 is a social network platform, such as, for example, Twitter or Facebook, then the user may post a predetermined message from the attestation service 106 on the social network platform via their user account 120 on that social network. If the trusted identity provider 102 does not have a public message board, the user may instead modify a specified public property in the public field 132 that is viewable or otherwise accessible by the attestation service 106. By detecting the modification to the specified public property, such as, for example, a user avatar, an address field, or another type of public facing data, the attestation service 106 may confirm that the user has control over the user account 120 managed by the trusted identity provider 102. These verification methods provide the potential benefit of asynchronous registration and verification of the user account 120 on the trusted identity provider 120. That is, the user may make the modification or post at any suitable time, and the attestation service 106 may asynchronously detect that modification or post at a different time to verify that the user controls the user account 120 on the trusted identity provider 102.

It should be appreciated that the verification methods described above do not require the trusted identity provider 102 to explicitly grant access to the attestation service 106 to use their platform. That is, the attestation service 106 may be a normal registered OAuth 2.0 client and/or may view public properties and messages to verify ownership of user account 120, and thus does not require explicit permission from the trusted identity provider 102 to utilize the user identity data 118 as described herein.

User identity data may, in some cases, change over time. As a few non-limiting examples, a user's employer may change, a user's citizenship status may change, a user's security clearance level may change, etc. However, due to the immutable nature of the blockchain, messages that are on the blockchain 126 may not be correspondingly updated. To address this issue, in one example, the attestation service 106 may be configured to query the trusted identity provider 102 for updates to the user identity data 118, and be configured to receive, from the trusted identity provider 102 or the user computer device 108, an updated user access token generated by the trusted identity provider. The updated user access token may be generated and processed similarly to the user access token 152. The updated user access token may include changes to the one or more identity claim 142 and/or an additional identity claim.

Similarly as described above, the updated user access token may be parsed to identify the one or more updated user identity claims and compared to the previously stored identity claims to identify the changes to the one or more identity claims and/or additional identity claim. Next, the attestation service 106 may be configured to store the changes to the one or more identity claims and/or additional identity claim by generating a blockchain transaction to the blockchain account 150 of the attestation service 106 that stores an updated mapping between the blockchain address of the user blockchain account 110 and the one or more updated identity claims and/or additional identity claim. The backend blockchain application 124 may be updated to refer to the newly generated blockchain transaction that stored the updated mapping such that third party blockchain applications may be mapped to the updated identity claims.

In one example, the one or more identity claims may have respective expiration dates or creation dates. That is, some types of identity claims may be more likely to change over time than other types of identity claims. For example, the user's employment information is much more likely to change in a period of time than that user's citizenship status. As another example, some types of identity data may be more time sensitive, and it may be more important to ensure that the identity data remains 'fresh". For example, security clearance levels may have short expiration dates so that third party applications that use that identity claim are aware of whether the identity claim is "fresh" or needs to be updated before being trusted. Thus, the attestation service 106 may be configured to store the expiration date and/or creation date with the associated identity claim on the blockchain.

In another example, the attestation service 106 may be integrated with the trusted identity provider 102 and may have direct access to the user accounts 120, and may thus verify that the user controls the user account 120 via typical credential processes. In this example, by integrating the attestation service 106 with the trusted identity provider 102, the trusted identity provider 102 may also have access to the functions and processes of the attestation service 106 described herein, and can thus automatically update or modify any identity claims for the user. That is, if the user identity data 118 of the user account 120 on the trusted identity provider 102 is updated, those changes may be reflected in new identity claims that are associated with the user's blockchain account 110 without requiring additional input from the user. Further in this example, the integrated trusted identity provider and attestation service system may be configured to automatically generate the blockchain account 110 and securely store the generated blockchain account for the user. The user may then access their blockchain account 110 via their user account 120 with the trusted identity provider 102.

At (2), the attestation service 106 may be configured to determine that the user of the user computing device 108 owns the user blockchain account 110. To prove that the user owns the user blockchain account 110 for the blockchain platform 104, the user may sign a message using the private key 112 of their user blockchain account 110. The attestation service 106 may be configured to obtain the signed message that has been signed with the private key 112 of the user. For example, the attestation service 106 may provide the user with a predetermined message 136 or code that the user should sign with their private key 112 to prove that they both own the user blockchain account 110 and are the same user that also has access to the user account 120 on the trusted identity provider 102. As another example, the predetermined message 136 may be the access token 152 or a hash of the access token 152 created at step (1B) that was provided to the middle tier computer system 114. That is, the signed message, such as, for example, the predetermined message 136, may include a user access token 152 from the user of the user computer device 108 and a blockchain address of the user blockchain account 110 of the user to associated with the access token 152. As described above, the user access token 152 may have been generated by the trusted identity provider service 102 executed on a third server, as described above.

As illustrated in FIG. 2, the user computer device 108 may sign the predetermined message 136 with the user's private key 112, and send the signed message 134 to the middle tier computer system 114 of the attestation service 106. That is, in one example, the attestation service 106 may be configured to obtain the signed message 135 by directly receiving the signed message 134 from the user computer device 108 via the computer network. The middle tier computer system 114 may then use the public address of the user's blockchain account 110 to verify that the predetermined message 136 was signed by the private key 112 of the user blockchain account 110 that only the user should have had access to. After verifying that the user sent the correct predetermined message 136 signed with the correct private key 112, the middle tier computer system 114 may confirm that the user owns/controls both the user account 120 on the trusted identify provider 102 and the user blockchain account 110.

In another example, rather than sending a signed message 134 to the attestation service 106, the user computer device 108 may be configured to emit a message onto the blockchain 126 which is unique and shows ownership of the account. For example, the user computer device 108 may sign the predetermined message 136 provided by the attestation service 106, and send the signed message to the blockchain platform 104 to be added to the blockchain 126 as a blockchain signed message 138 via typical blockchain processes. In this example, the user computer device 108 may provide the verification in the form of the blockchain signed message 138 asynchronously with the attestation service 106. That is, once the blockchain signed message 138 has been added to the blockchain 126 and becomes immutable, the attestation service 106 may view and search the blockchain 126 of the blockchain platform 104 to detect the signed blockchain message 138, and verify that the user signed the predetermined message 136 with the correct private key similarly as described above.

The above two verification examples are applicable when the user intends to associate user identity data 118 with an already existing user blockchain account 110 owned by the user. In another example, after the user has verified that they control the user account 120 on the trusted identity provider 102, the middle tier computer system 114 may be configured to programmatically generate a new user blockchain account 110 on behalf of the user by generating a new private key 112. The middle tier computer system 114 may then send the newly generated private key 112 to the user's computer device 108. In this manner, as the middle tier computer system 114 itself generated the user blockchain account 110, the middle tier computer system 114 knows that it is mathematically highly likely that no other user could have generated the same private key 112 and thus does not need to perform further verification. That is, the user that the middle tier computer system 114 sends the newly generated private key 112 is the user that now owns that user blockchain account 110.

In examples where the signed message 134 includes the signed user access token 152, the attestation service 106 may be further configured to verify the signed message 134 by verifying that a resource of the signed user access token 152 is for the attestation service 106. That is, as part of the OAuth 2.0 protocol, the trusted identity provider 102 may generate the user access token 152 to include an audience value that includes the middle tier computer system 114 of the attestation service 106 to prove that the signed access token 152 is intended to be used to verify the user's accounts 120 on the trusted identity provider 120. In another example, the attestation service 106 may be configured to verify the signed message 134 by verifying that the user access token 152 was signed by the trusted identity provider 102. In another example, the attestation server 106 may be configured to verify the signed message 134 by verifying that the signed message 134 was signed by the user that is associated with the blockchain address that is included in the signed message. It should be appreciated that the attestation service 106 may implement one or more of these verification methods.

(3) Attest to user identity claims based on the user identity data 118 received from the trusted identity provider 102, and make those user identity claims available to third-party blockchain applications 122 on the blockchain platform 104. In one example, the middle tier computer system 114 may be configured to, at (3A), create a blockchain transaction 140 to store an identity claim 142 on the blockchain 126. The identity claim 142 attests that the user blockchain account 110 is associated with a particular user identity data 118, such as, for example, a gender of the owner of the user blockchain account 110, an employer of the owner of the user blockchain account 110, etc. It should be appreciated that a plurality of identity claim 142 may be associated with the user blockchain account 110 in one or more blockchain signed identity claims 138. Each blockchain signed identity claim 138 may include one or more identity claim 142, and an attestation service signature 144. The attestation service signature 144 may be used to by blockchain applications and computer devices to verify that the blockchain signed identity claim 138 was signed by the attestation service 106.

As described above, the middle tier computer system 114 of the attestation service 106 may own and control the backend blockchain application 124, which may include functions and methods that may be called/utilized by a plurality of different third-party blockchain applications 122 to confirm one or more user identity claims for the user blockchain account 110.

For example, the backend blockchain application 124 may be configured to generate a blockchain transaction that stores a mapping between the blockchain address of the user blockchain account 110 and the one or more identity claims. These blockchain transactions may be generate for each user blockchain account 110 to map their blockchain addresses to their associated blockchain signed identity claim 138 stored on the blockchain 126. The backend blockchain application 124 may expose getter functions that allow the third-party blockchain applications 122 to pull one or more of the identity claim 142 associated with a particular user blockchain account 110. In one example, the mapping is a first mapping associated with the user blockchain account 110 and the one or more identity claims are a first set of one or more identity claims. In this example, the attestation service 106 may be configured to generate an additional blockchain account for a second set of identity claims made by the user and store a second mapping between the additional blockchain account and the second set of identity claims. The attestation service 106 may be further configured to ensure that each type of identity claim is only mapped once by the user. For example, the attestation service 106 may verify that only one type of employer identity claim and one type of citizenship status is mapped to the user to prevent potential sybil attacks.

In the example illustrated in FIG. 2, at step (4) a third-party blockchain application 122 may send an identity query 154 to the backend blockchain application 124 that calls the getter functions of the backend blockchain application 124 to pull one or more identity claim 142 that are associated with the user's blockchain account 110 and attested to by the attestation service 106.

In this example, the backend blockchain identity application 124 may be configured to receive the identity query 154 from the third-party application 122 on the blockchain 126 that is associated with a third-party service executed on a third-party server. Next, the backend blockchain identity application 124 may be configured to transmit a response to the identity query 154 that is generate based on the stored mapping between the blockchain address of the user blockchain account 110 and the one or more identity claims to the third-party application 122.

In another example, the identity claim 142 may be stored at a storage location that is off the blockchain 126 using a decentralized identifier process. In this example, after the middle tier computer system 114 has verified that the user owns both the user blockchain account 110 and the user account 120 on the trusted identity provider 102, the middle tier computer system 114 may be configured to, at (3B) sign a message including the identity claim 142 using a private key owned by the middle tier computer system 114. The one or more signed identity claim 146, which, for example, each include one or more identity claim 142 associated with the user's block account 110 and an attestation service signature 144. The one or more signed identity claim 146 may be sent by the middle tier computer system 114 to the user computer device 108. Subsequently, the user may then present the one or more signed identity claim 146 to other entities that own third-party blockchain applications 122 on the blockchain platform 104 to confirm the user's identity data. These other entities may verify that the attestation service 106 signed the identity claim 142 using the attestation service signature 144. In this manner, each user may control their own identity data, and may store and provide the identity claims off the block chain using such a decentralized identifier process.

Figure 3:
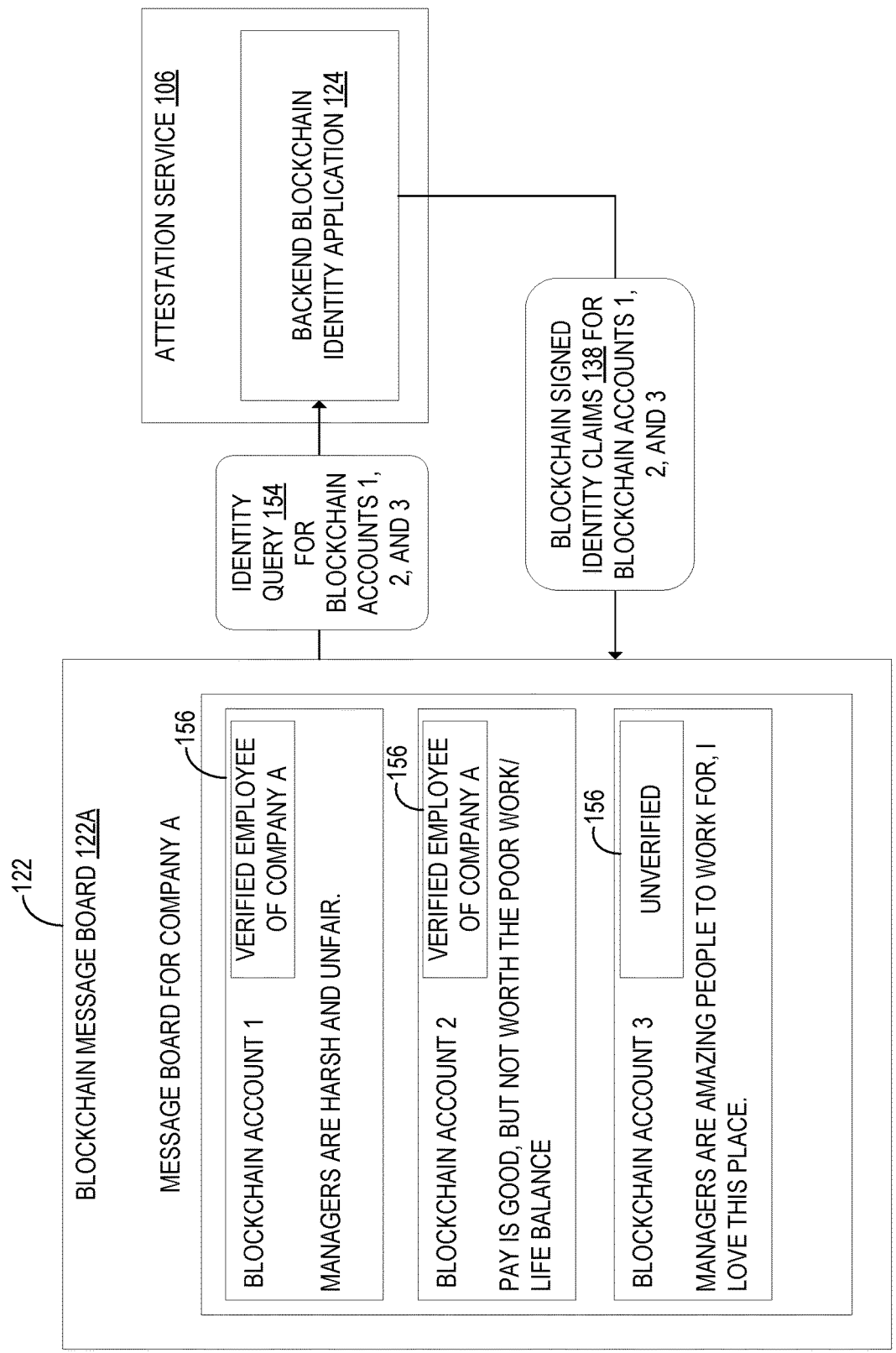
FIG. 3 shows an example third party blockchain application that verifies identity claims associated with blockchain accounts using the example identity attestation system of FIG. 1.

As one use case example, FIG. 3 illustrates an example pseudo-anonymous blockchain message board 122A as an example third party blockchain application 122. The pseudo-anonymous blockchain message board 122A may provide functions for users to post messages, but the only user identity detail provided for the posters of those messages is that user's employer. This allows users to talk openly about details like pay, work/life balance, company culture, hiring, etc. Non-blockchain implementations of such a pseudo-anonymous message board may be centralized, potentially allowing administrators who control the application to censor and manipulate the posts on the application. If the pseudo-anonymous message board was built on blockchain technology, it would eliminate both of these issues. However, to ensure that a particular user actually works for the company they are posting about, and to prevent astroturfing or other types of attacks, the attestation service 106 may verify user identity data for each posting user and provide identity claims to the blockchain based pseudo-anonymous message board.

In the example illustrated in FIG. 3, three different users have posted to the blockchain message board 122A at a message board for 'Company A' via the blockchain accounts 1, 2, and 3. To prevent sybil and other types of reputation attacks described above, the blockchain message board 122A is configured to send an identity query 154 to the backend blockchain identity application 124 on the blockchain 126 for the blockchain accounts 1, 2, and 3. The backend blockchain identity application 124 may be owned by the attestation service 106 and executed via the distributed virtual machine of the blockchain platform 104. As described above, the backend blockchain identity application 124 may be configured to look-up the blockchain accounts 1, 2, and 3 from the query in the blockchain stored mapping between accounts and identity claims stored on the blockchain 126. The backend blockchain identity application 124 may response to the identity query 154 with relevant identity claim 142 for the supplied blockchain accounts. In the example illustrated in FIG. 3, the backend blockchain identity application 124 responds to the blockchain message board application 122A with blockchain signed identity claim 138 for the blockchain accounts 1, 2, and 3, for employment status identity claims of those blockchain accounts. In particular, blockchain accounts 1 and 2 have verified identity claims of being employees at 'Company A', while blockchain account 3 does not have a verified identity claim of being an employee at 'Company A'". Thus, the blockchain message board 122A may show the the verified identity claim status 156 on the message board. In this manner, each user on the blockchain message board 122A may be shown relevant verified identity claims of other users on the board in a pseudo-anonymous manner without exposing the real identity of those users.

As another use case example, the creation of new cryptocurrencies and tokens using platforms like ETHEREUM has increased. These tokens, by nature, are publicly accessible, which means any user can participate and interact with these tokens. A new class of tokens which are only accessible by certain group of users may potentially provide value. For example, a new cryptocurrency token may be created for a particular trusted identity, such as, for example, employees of a company. To claim or use these kinds of tokens, the third-party blockchain application 122 maintaining control over those tokens may use the attestation service 106 to prove certain details about a blockchain identity interacting with a token. As a specific example, a token may be created which represents "reputation" among a company. As users do good things for others, they can be awarded reputation tokens which can later be redeemed for items within the company. The token contract would be built to only allow users with certain attestations to interact with the token.

As another use case example, blockchain technologies have the ability to disrupt how modern users vote in electoral processes which require high security and may be the target of attacks. Due to the distributed, decentralized, censorship-free, and immutable properties of the blockchain, they make potentially valuable platforms to build electoral ballots. However, these are precisely the kinds of applications which are subject to Sybil attacks. Through an attestation service as described herein, users would be able to verify their identity, such as their citizenship status, and voting contracts would be able to verify that each user can only submit a single vote.

It will be appreciated that data associated with user accounts on different platforms is often dynamic and changes over time. For this reason, the identity claims associated with the blockchain account of the user may have respective expiration dates. Data changes quickly in modern systems, but on the blockchain, data is historically permanent and immutable. User identity data such as their last name, age, company affiliation, residence location, etc., may change over time. Thus, the identity system can accommodate these changes by setting expiration dates for the identity claims stored by the attestation service.

It will be appreciated that rather than make updates directly to the blockchain, the user and the attestation service can interact with one another in a series of off-blockchain communications. Each message in this type of communication takes the form of a signed transaction which is not published to the ETHEREUM blockchain. This conversation can continue and be treated as a true until one of the two parties disagrees with the state of the conversation. At that point, either party can emit the transactions to the blockchain, and have the blockchain resolve any discrepancies. This could allow batching of changes and reduce overall cost of transaction.

The attestation service 106 may be configured to not allow a single trusted identity to attest to multiple blockchain identities. For example, if the attestation is about which company a user works for, and the user is allowed to attest to multiple accounts, then that user could create many accounts, all with the same employment information, and sell them to others to fake their authorization. This would reduce the value of such information, and make such a system vulnerable to Sybil attacks.

At the same time, personally identifiable information about the user should not be stored on the blockchain because it will be made public. One such way to solve this is to take the hash of a unique identifier and use that as a key to determine whether a trusted account has already been used to attest to a blockchain identity. If so, there can be special logic, such as checking for key collision, to handle the situation to ensure that there is a 1:1 user mapping.

It will be appreciated that a user may want to have different levels of information about themselves exposed to different applications. For example, a social networking application may want the full details of the user, but a voting application may want some amount of anonymity. Using an on-chain storage system for the claims, there are issues where the most amount of information made available about a user will be available to all applications and everyone else. This can be solved by having different storage locations for different pieces of information, associated with different accounts. A user who wants to progressively disclose details about themselves proves they have access to accounts with the right information. Thus, for a particular user, the computing system 100 can create a plurality of blockchain accounts, each having independent mappings to respective sets of identity claims. Further, to prevent abuse, the attestation service 106, including the middle tier computer system 114 and the backend blockchain application 124, may be configured to monitor these identity claims to ensure that ensure that each specific type of identity claim is only mapped once by the user. The data resolution of the identity claims can be progressively organized. For example, in the case of demographics, a first blockchain account of a user may be mapped to identity claims that the user is a U.S. citizen only, and a second blockchain account may be mapped to identity claims that the user is a U.S. citizen, resident of Washington State, and aged 20-30 years old. The user can selectively provide these accounts to third parties to control the resolution at which the information is disseminated.

There may be situations where a trusted identity provider wants to revoke a claim they previously verified on the blockchain. In order to do this, the trusted identity provider needs to directly participate in the verification process. In this case, the trusted identity provider would have its own blockchain identity which is publicly announced to the world. Attestations would be recorded partially or fully on the blockchain using the trusted identity provider's identity. That trusted identity provider would then have access to modify any of these attestations based on changes in data. In this situation, the attestation service 106 may not need to control the attested data, but may simply control which accounts represent real trusted identity providers, and control their access to the underlying storage on the blockchain. In this example, either (or both) the middle tier computer system 114 or the backend blockchain application 124 may be configured to manage access to the underlying storage.

Figure 4:
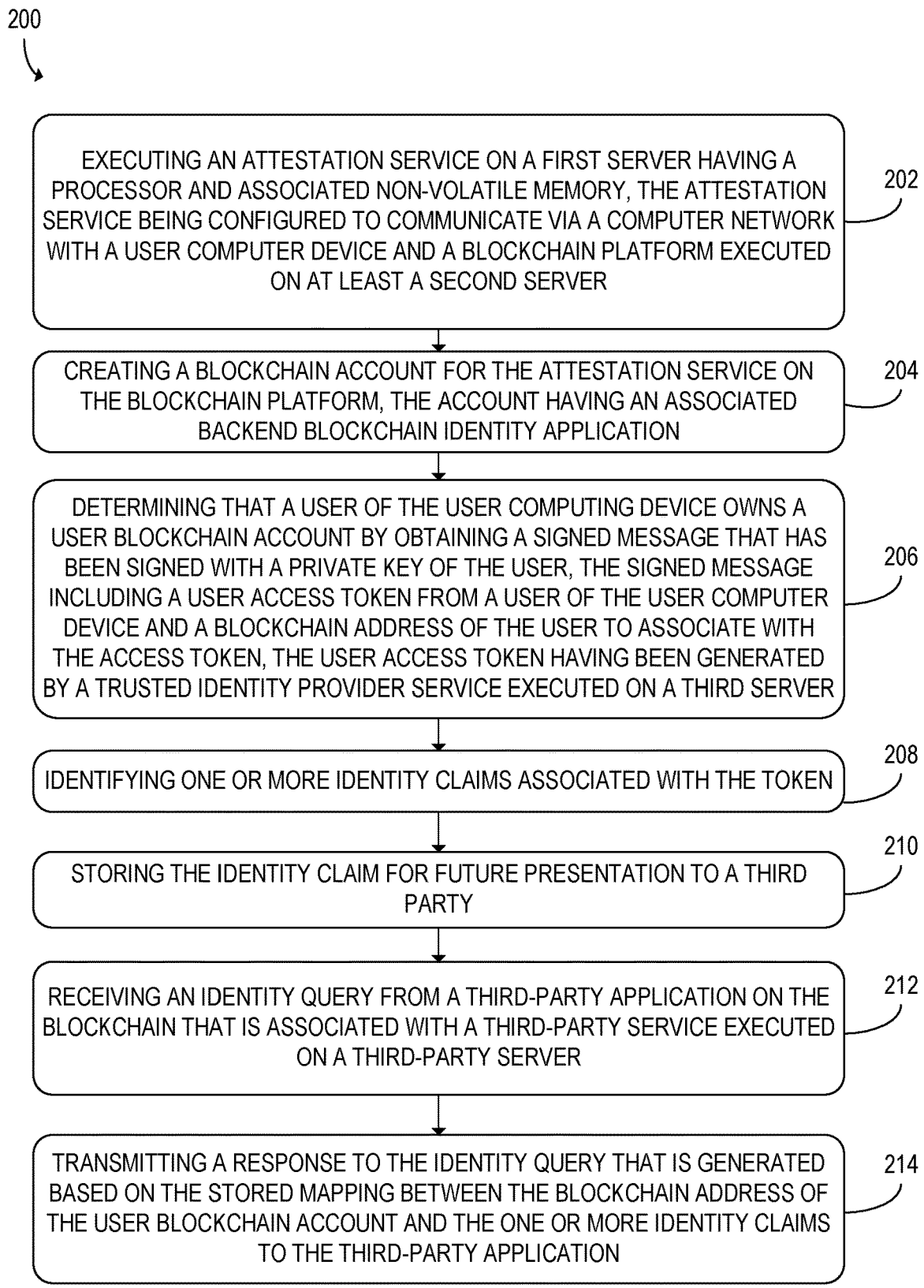
FIG. 4 shows a flowchart of an example method for attesting to an identity claim of a user on a blockchain platform using the example identity attestation system of FIG. 1.

FIG. 4 shows a flowchart of a computer-implemented method 200. The method 200 may be implemented by the middle tier computer system 114 of FIG. 1. At 202, the method 200 may include executing an attestation service on a first server having a processor and associated non-volatile memory. The attestation service is configured to communicate via a computer network with a user computer device and a blockchain platform executed on at least a second server. The attestation service may be implemented by a middle tier computer system 114, as illustrated in FIG. 1 and described above.

At step 204, at the attestation service, the method 200 may include creating a blockchain account for the attestation service on the blockchain platform, the account having an associated backend blockchain identity application. In one example, the blockchain platform includes a distributed virtual machine configured to execute the computer code of the smart contracts using the hardware resources of client computing devices participating in the blockchain platform 104. The backend blockchain identity application may be executed by such a distributed virtual machine. One example blockchain platform 104 with these features is ETHEREUM.

At step 206, the method 200 may include determining that a user of the user computing device owns a user blockchain account by obtaining a signed message that has been signed with a private key of the user. The signed message may include a user access token from a user of the user computer device and a blockchain address of the user to associate with the access token, the user access token having been generated by a trusted identity provider service executed on a third server. The user access token may be obtained via the OAUTH 2.0 protocol, as described above with reference to FIG. 2.

In one example, obtaining the signed message is accomplished at least in part by at least one of the following steps: directly receiving the signed message from the user computing device via computer network, searching the blockchain for a signed blockchain message that has been signed by the user using the user's private key, or programmatically generating the user blockchain account on behalf of the user.

In this example, step 206 may further include verifying the signed message. For example, the method 200 may include verifying that a resource of the user access token is for the attestation service. In another example, the method 200 may include verifying that the user access token was signed by the trusted identity provider. In yet another example, the method 200 may include verifying that the signed message was signed by the user that is associated with the blockchain address that is included in the signed message.

At step 208, the method 200 may include identifying one or more identity claims associated with the token. In one example, identifying the one or more identity claims is accomplished at least in part by parsing the user access token.

At step 210, the method 200 may include storing the identity claim for future presentation to a third party. In one example, step 210 may further include generating a blockchain transaction to the blockchain account of the attestation service that stores a mapping between the blockchain address of the user blockchain account and the one or more identity claims. In another example, step 210 may include storing the identity claim at a storage location that is off the blockchain using a decentralized identifier.

In some examples, the identity claims stored at step 210 may be updated over time. However, due to the immutable nature of the blockchain, the already existing blockchain transactions may not be modified to reflect the updated identity claims, as described above. In these examples, step 210 may further include receiving an updated user access token generated by the trusted identity provider, the updated user access token including changes to the one or more identity claims and/or an additional identity claim, and storing the changes to the one or more identity claims and/or the additional identity claim by generating a blockchain transaction to the blockchain account of the attestation service that stores an updated mapping between the blockchain address of the user blockchain account and the one or more updated identity claims and/or additional identity claim.

At step 212, the method 200 may include receiving an identity query from a third-party application on the blockchain that is associated with a third-party service executed on a third-party server. The identity query may be sent to the backend blockchain identity application 124 described above with reference to FIG. 2.

At step 214, the method 200 may include transmitting a response to the identity query that is generated based on the stored mapping between the blockchain address of the user blockchain account and the one or more identity claims to the third-party application. The response may be generated as described above with reference to FIG. 2.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
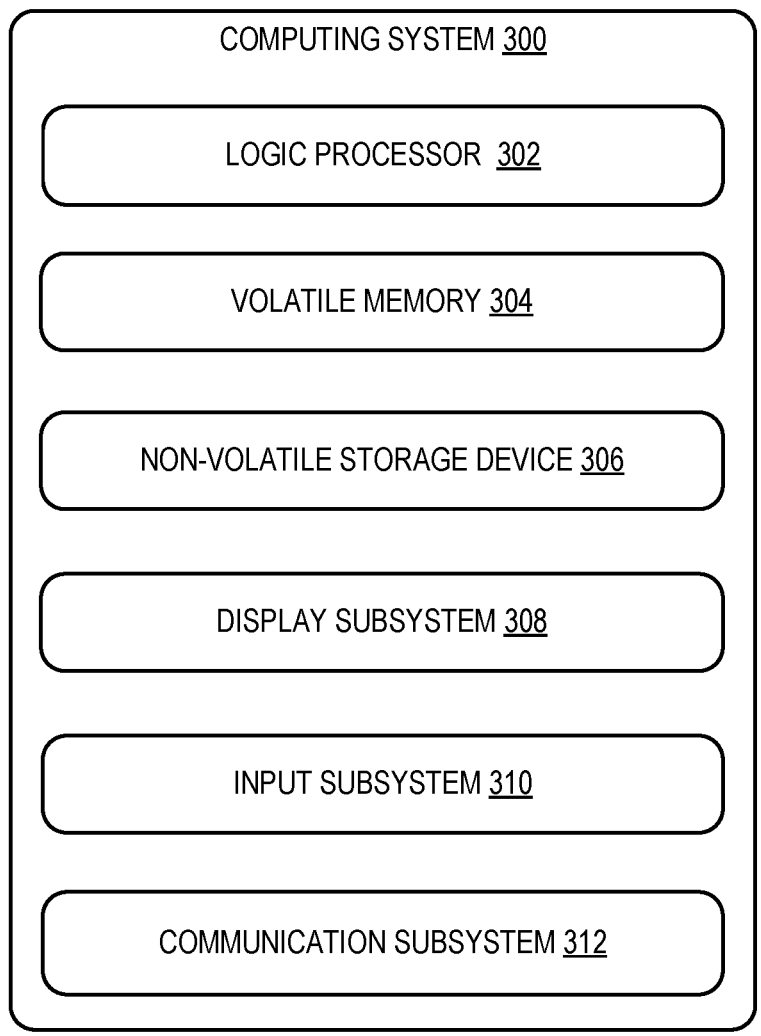
FIG. 5 shows a schematic view of an example computing environment in which the identity attestation system of FIG. 1 may be enacted.

FIG. 5 schematically shows a non-limiting embodiment of a computing system 300 that can enact one or more of the methods and processes described above. Computing system 300 is shown in simplified form. Computing system 300 may embody the computer device 10 described above and illustrated in FIG. 2. Computing system 300 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 300 includes a logic processor 302 volatile memory 304, and a non-volatile storage device 306. Computing system 300 may optionally include a display subsystem 308, input subsystem 310, communication subsystem 312, and/or other components not shown in FIG. 5.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 304 may be transformed—e.g., to hold different data.

Non-volatile storage device 306 may include physical devices that are removable and/or built-in. Non-volatile storage device 304 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 300 to send and/or receive messages to and/or from other devices via a network such as the Internet.

The following paragraphs provide additional support for the claims of the subject application. One aspect provides an identity system, comprising an attestation service executed on a first server having a processor and associated non-volatile memory, the attestation service being configured to communicate via a computer network with a user computer device and a blockchain platform executed on at least a second server. The attestation service executes instructions stored in the non-volatile memory via the processor to create a blockchain account for the attestation service on the blockchain platform, the account having an associated back-end blockchain identity application, determine that a user of the user computing device owns a user blockchain account by obtaining a signed message that has been signed with a private key of the user, the signed message including a user access token from a user of the user computer device and a blockchain address of the user to associate with the access token, the user access token having been generated by a trusted identity provider service executed on a third server, identify one or more identity claims associated with the token, and store the identity claim for future presentation to a third party. In this aspect, additionally or alternatively, the attestation service may be configured to store the identity claim by generating a blockchain transaction to the blockchain account of the attestation service that stores a mapping between the blockchain address of the user blockchain account and the one or more identity claims. In this aspect, additionally or alternatively, to obtain the signed message, the attestation service may be configured to directly receive the signed message from the user computing device via the computer network. In this aspect, additionally or alternatively, to obtain the signed message, the attestation service may be configured to search the blockchain for a signed blockchain message that has been signed by the user using the private key of the user. In this aspect, additionally or alternatively, to obtain the signed message, the attestation service may be configured to programmatically generate the user blockchain account on behalf of the user. In this aspect, additionally or alternatively, the attestation service may be further configured to verify the signed message, by one or more of verifying that a resource of the user access token is for the attestation service, verifying that the user access token was signed by the trusted identity provider, and verifying that the signed message was signed by the user that is associated with the blockchain address that is included in the signed message. In this aspect, additionally or alternatively, identifying the one or more identity claims may be accomplished at least in part by parsing the user access token. In this aspect, additionally or alternatively, the attestation service may be further configured to receive an updated user access token generated by the trusted identity provider, the updated user access token including changes to the one or more identity claims and/or an additional identity claim, and store the changes to the one or more identity claims and/or the additional identity claim by generating a blockchain transaction to the blockchain account of the attestation service that stores an updated mapping between the blockchain address of the user blockchain account and the one or more updated identity claims and/or additional identity claim. In this aspect, additionally or alternatively, the backend blockchain identity application may be configured to receive an identity query from a third-party application on the blockchain that is associated with a third-party service executed on a third-party server, and transmit a response to the identity query that is generated based on the stored mapping between the blockchain address of the user blockchain account and the one or more identity claims to the third-party application. In this aspect, additionally or alternatively, the mapping may be a first mapping associated with the user blockchain account and the one or more identity claims are a first set of one or more identity claims, wherein the attestation service may be configured to generate an additional blockchain account for a second set of identity claims made by the user and store a second mapping between the additional blockchain account and the second set of identity claims, and wherein the attestation service may be configured to ensure that each type of identity claim is only mapped once by the user. In this aspect, additionally or alternatively, the one or more identity claims may have respective expiration dates or creation dates. In this aspect, additionally or alternatively, the attestation service may be configured to store the identity claim at a storage location that is off the blockchain using a decentralized identifier.

Another aspect provides an identity method, comprising executing an attestation service on a first server having a processor and associated non-volatile memory, the attestation service being configured to communicate via a computer network with a user computer device and a blockchain platform executed on at least a second server. At the attestation service, the identity method further comprises creating a blockchain account for the attestation service on the blockchain platform, the account having an associated backend blockchain identity application, determining that a user of the user computing device owns a user blockchain account by obtaining a signed message that has been signed with a private key of the user, the signed message including a user access token from a user of the user computer device and a blockchain address of the user to associate with the access token, the user access token having been generated by a trusted identity provider service executed on a third server, identifying one or more identity claims associated with the token, and storing the identity claim for future presentation to a third party. In this aspect, additionally or alternatively, storing the identity claim may be accomplished at least in part by at least one of generating a blockchain transaction to the blockchain account of the attestation service that stores a mapping between the blockchain address of the user blockchain account and the one or more identity claims, or storing the identity claim at a storage location that is off the blockchain using a decentralized identifier. In this aspect, additionally or alternatively, obtaining the signed message may be accomplished at least in part by at least one of directly receiving the signed message from the user computing device via the computer network, searching the blockchain for a signed blockchain message that has been signed by the user using the user's private key, and programmatically generating the user blockchain account on behalf of the user. In this aspect, additionally or alternatively, the attestation service may be further configured to verify the signed message, by one or more of verifying that a resource of the user access token is for the attestation service, verifying that the user access token was signed by the trusted identity provider, and verifying that the signed message was signed by the user that is associated with the blockchain address that is included in the signed message. In this aspect, additionally or alternatively, identifying the one or more identity claims may be accomplished at least in part by parsing the user access token. In this aspect, additionally or alternatively, the identity method may further comprise, at the attestation service, receiving an updated user access token generated by the trusted identity provider, the updated user access token including changes to the one or more identity claims and/or an additional identity claim, and storing the changes to the one or more identity claims and/or the additional identity claim by generating a blockchain transaction to the blockchain account of the attestation service that stores an updated mapping between the blockchain address of the user blockchain account and the one or more updated identity claims and/or additional identity claim. In this aspect, additionally or alternatively, the backend blockchain identity application may be configured to receive an identity query from a third-party application on the blockchain that is associated with a third-party service executed on a third-party server, and transmit a response to the identity query that is generated based on the stored mapping between the blockchain address of the user blockchain account and the one or more identity claims to the third-party application.

Another aspect provides an identity system, comprising an attestation service executed on a first server having a processor and associated non-volatile memory, the attestation service being configured to communicate via a computer network with a user computer device and a blockchain platform executed on at least a second server. The attestation service executes instructions stored in the non-volatile memory via the processor to create a blockchain account for the attestation service on the blockchain platform, the account having an associated backend blockchain identity application, determine that a user of the user computing device owns a user blockchain account by obtaining a signed message that has been signed with a private key of the user, the signed message including a user access token from a user of the user computer device and a blockchain address of the user to associate with the access token, the user access token having been generated by a trusted identity provider service executed on a third server, identify one or more identity claims associated with the token by parsing the user access token, and generate a blockchain transaction to the blockchain account of the attestation service that stores a mapping between the blockchain address of the user blockchain account and the one or more identity claims Obtaining the signed message is accomplished by directly receiving the signed message from the user computing device via computer network, searching the blockchain for a signed blockchain message that has been signed by the user using the user's private key, or programmatically generating the user blockchain account on behalf of the user. The backend blockchain identity application is configured to receive an identity query from a third-party application on the blockchain that is associated with a third-party service executed on a third-party server, and transmit a response to the identity query that is generated based on the stored mapping between the blockchain address of the user blockchain account and the one or more identity claims to the third-party application.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An identity system, comprising:
an attestation service executed on a first server having a processor and associated non-volatile memory, the attestation service being configured to communicate via a computer network with a user computer device and a blockchain platform executed on at least a second server, wherein the attestation service executes instructions stored in the non-volatile memory via the processor to:
create a blockchain account for the attestation service on the blockchain platform, the account having an associated backend blockchain identity application;
determine that a user of the user computing device owns a user blockchain account by obtaining a signed message that has been signed with a private key of the user, the signed message including a user access token from the user of the user computer device and a blockchain address of the user to associate with the access token, the user access token having been generated by a trusted identity provider service executed on a third server, wherein the signed message is directly received from the user computing device via a computer network;
identify one or more identity claims associated with the token; and
store the one or more identity claims for future presentation to a third party by generating a blockchain transaction to the blockchain account of the attestation service that stores a mapping between the blockchain address of the user blockchain account and the one or more identity claims.

2. The identity system of claim 1, wherein to obtain the signed message, the attestation service is further configured to programmatically generate the user blockchain account on behalf of the user.

3. The identity system of claim 1, wherein the attestation service is further configured to verify the signed message, by one or more of:
verifying that a resource of the user access token is for the attestation service;
verifying that the user access token was signed by the trusted identity provider; and
verifying that the signed message was signed by the user that is associated with the blockchain address that is included in the signed message.

4. The identity system of claim 1, wherein identifying the one or more identity claims is accomplished at least in part by parsing the user access token.

5. The identity system of claim 1, wherein the attestation service is further configured to:
receive an updated user access token generated by the trusted identity provider, the updated user access token including changes to the one or more identity claims and/or an additional identity claim; and
store the changes to the one or more identity claims and/or the additional identity claim by generating an updated blockchain transaction to the blockchain account of the attestation service that stores an updated mapping between the blockchain address of the user blockchain account and the one or more updated identity claims and/or additional identity claim.

6. The identity system of claim 1, wherein the one or more identity claims have respective expiration dates or creation dates.

7. The identity system of claim 1, wherein the attestation service is configured to store the identity claim at a storage location that is off the blockchain using a decentralized identifier.

8. An identity system, comprising:
an attestation service executed on a first server having a processor and associated non-volatile memory, the attestation service being configured to communicate via a computer network with a user computer device and a blockchain platform executed on at least a second server, wherein the attestation service executes instructions stored in the non-volatile memory via the processor to:
create a blockchain account for the attestation service on the blockchain platform, the account having an associated backend blockchain identity application;
determine that a user of the user computing device owns a user blockchain account by obtaining a signed message that has been signed with a private key of the user, the signed message including a user access token from the user of the user computer device and a blockchain address of the user to associate with the access token, the user access token having been generated by a trusted identity provider service executed on a third server, wherein to obtain the signed message, the attestation service is configured to search the blockchain for a signed blockchain message that has been signed by the user using the private key of the user;
identify one or more identity claims associated with the token; and
store the one or more identity claims for future presentation to a third party by generating a blockchain transaction to the blockchain account of the attestation service that stores a mapping between the blockchain address of the user blockchain account and the one or more identity claims.

9. The identity system of claim 8, wherein the attestation service is further configured to verify the signed message, by one or more of:
verifying that a resource of the user access token is for the attestation service;

verifying that the user access token was signed by the trusted identity provider; and verifying that the signed message was signed by the user that is associated with the blockchain address that is included in the signed message.

10. An identity system, comprising:

an attestation service executed on a first server having a processor and associated non-volatile memory, the attestation service being configured to communicate via a computer network with a user computer device and a blockchain platform executed on at least a second server, wherein the attestation service executes instructions stored in the non-volatile memory via the processor to:

create a blockchain account for the attestation service on the blockchain platform, the account having an associated backend blockchain identity application;

determine that a user of the user computing device owns a user blockchain account by obtaining a signed message that has been signed with a private key of the user, the signed message including a user access token from the user of the user computer device and a blockchain address of the user to associate with the access token, the user access token having been generated by a trusted identity provider service executed on a third server;

identify one or more identity claims associated with the token;

store the one or more identity claims for future presentation to a third party by generating a blockchain transaction to the blockchain account of the attestation service that stores a mapping between the blockchain address of the user blockchain account and the one or more identity claims, wherein the backend blockchain identity application is configured to:

receive an identity query from a third-party application on the blockchain that is associated with a third-party service executed on a third-party server; and transmit a response to the identity query that is generated based on the stored mapping between the blockchain address of the user blockchain account and the one or more identity claims to the third-party application.

11. The identity system of claim 10, wherein the attestation service is further configured to verify the signed message, by one or more of:

verifying that a resource of the user access token is for the attestation service;

verifying that the user access token was signed by the trusted identity provider; and verifying that the signed message was signed by the user that is associated with the blockchain address that is included in the signed message.

12. An identity system, comprising:

an attestation service executed on a first server having a processor and associated non-volatile memory, the attestation service being configured to communicate via a computer network with a user computer device and a blockchain platform executed on at least a second server, wherein the attestation service executes instructions stored in the non-volatile memory via the processor to:

create a blockchain account for the attestation service on the blockchain platform, the account having an associated backend blockchain identity application;

determine that a user of the user computing device owns a user blockchain account by obtaining a signed message that has been signed with a private key of the user, the signed message including a user access token from the user of the user computer device and a blockchain address of the user to associate with the access token, the user access token having been generated by a trusted identity provider service executed on a third server;

identify one or more identity claims associated with the token;

store the one or more identity claims for future presentation to a third party by generating a blockchain transaction to the blockchain account of the attestation service that stores a mapping between the blockchain address of the user blockchain account and the one or more identity claims; and wherein the mapping is a first mapping associated with the user blockchain account and the one or more identity claims are a first set of one or more identity claims, the attestation service being configured to generate an additional blockchain account for a second set of identity claims made by the user and store a second mapping between the additional blockchain account and the second set of identity claims, and wherein the attestation service is configured to ensure that each type of identity claim is only mapped once by the user.

13. The identity system of claim 12, wherein the attestation service is further configured to verify the signed message, by one or more of:

verifying that a resource of the user access token is for the attestation service;

verifying that the user access token was signed by the trusted identity provider; and verifying that the signed message was signed by the user that is associated with the blockchain address that is included in the signed message.

14. An identity method, comprising:

executing an attestation service on a first server having a processor and associated non-volatile memory, the attestation service being configured to communicate via a computer network with a user computer device and a blockchain platform executed on at least a second server;

at the attestation service, creating a blockchain account for the attestation service on the blockchain platform, the account having an associated backend blockchain identity application;

determining that a user of the user computing device owns a user blockchain account by obtaining a signed message that has been signed with a private key of the user, the signed message including a user access token from the user of the user computer device and a blockchain address of the user to associate with the access token, the user access token having been generated by a trusted identity provider service executed on a third server;

verifying the signed message, by one or more of: verifying that a resource of the user access token is for the attestation service, verifying that the user access token was signed by the trusted identity provider, and verifying that the signed message was signed by the user that is associated with the blockchain address that is included in the signed message;

identifying one or more identity claims associated with the token; and storing the one or more identity claims for future presentation to a third party.

15. The identity method of claim 14, wherein storing the identity claim is accomplished at least in part by at least one of:
generating a blockchain transaction to the blockchain account of the attestation service that stores a mapping between the blockchain address of the user blockchain account and the one or more identity claims; or
storing the one or more identity claims at a storage location that is off the blockchain using a decentralized identifier.

16. The identity method of claim 15, wherein obtaining the signed message is accomplished at least in part by at least one of:
directly receive the signed message from the user computing device via computer network;
searching the blockchain for a signed blockchain message that has been signed by the user using the user's private key; or
programmatically generating the user blockchain account on behalf of the user.

17. The identity method of claim 14, wherein identifying the one or more identity claims is accomplished at least in part by parsing the user access token.

18. The identity method of claim 15, further comprising:
at the attestation service:
receiving an updated user access token generated by the trusted identity provider, the updated user access token including changes to the one or more identity claims and/or an additional identity claim; and
storing the changes to the one or more identity claims and/or the additional identity claim by generating an updated blockchain transaction to the blockchain account of the attestation service that stores an updated mapping between the blockchain address of the user blockchain account and the one or more updated identity claims and/or additional identity claim.

19. The identity method of claim 15, wherein the backend blockchain identity application is configured to:
receive an identity query from a third-party application on the blockchain that is associated with a third-party service executed on a third-party server; and
transmit a response to the identity query that is generated based on the stored mapping between the blockchain address of the user blockchain account and the one or more identity claims to the third-party application.

20. An identity system, comprising:
an attestation service executed on a first server having a processor and associated non-volatile memory, the attestation service being configured to communicate via a computer network with a user computer device and a blockchain platform executed on at least a second server, wherein the attestation service executes instructions stored in the non-volatile memory via the processor to:
create a blockchain account for the attestation service on the blockchain platform, the account having an associated backend blockchain identity application;
determine that a user of the user computing device owns a user blockchain account by obtaining a signed message that has been signed with a private key of the user, the signed message including a user access token from the user of the user computer device and a blockchain address of the user to associate with the access token, the user access token having been generated by a trusted identity provider service executed on a third server;
identify one or more identity claims associated with the token by parsing the user access token; and
generate a blockchain transaction to the blockchain account of the attestation service that stores a mapping between the blockchain address of the user blockchain account and the one or more identity claims;
wherein obtaining the signed message is accomplished by:
directly receiving the signed message from the user computing device via computer network;
searching the blockchain for a signed blockchain message that has been signed by the user using the user's private key; or
programmatically generating the user blockchain account on behalf of the user; and
wherein the backend blockchain identity application is configured to:
receive an identity query from a third-party application on the blockchain that is associated with a third-party service executed on a third-party server; and
transmit a response to the identity query that is generated based on the stored mapping between the blockchain address of the user blockchain account and the one or more identity claims to the third-party application.

* * * * *